（12）United States Patent
Kannan

(10) Patent No.: US 9,113,406 B2
(45) Date of Patent: Aug. 18, 2015

(54) METHOD AND SYSTEM TO CONFIGURE NETWORK DEVICES

(71) Applicant: Venkatesh Kannan, Sunnyvale, CA (US)

(72) Inventor: Venkatesh Kannan, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 157 days.

(21) Appl. No.: 13/653,225

(22) Filed: Oct. 16, 2012

(65) Prior Publication Data

US 2014/0105061 A1 Apr. 17, 2014

(51) Int. Cl.
*H04W 48/20* (2009.01)
*H04W 64/00* (2009.01)
*H04W 48/04* (2009.01)

(52) U.S. Cl.
CPC .............. *H04W 48/20* (2013.01); *H04W 48/04* (2013.01); *H04W 64/00* (2013.01)

(58) Field of Classification Search
CPC ...... H04W 48/20; H04W 64/00; H04W 48/04
USPC ................... 370/254, 221, 241, 242; 455/403, 455/422.1, 434
See application file for complete search history.

(56) References Cited

U.S. PATENT DOCUMENTS

| 2011/0250884 | A1* | 10/2011 | Brunel et al. | 455/434 |
| 2012/0158293 | A1* | 6/2012 | Burnham | 701/439 |
| 2012/0161971 | A1* | 6/2012 | Nasir et al. | 340/573.4 |
| 2012/0269334 | A1* | 10/2012 | Goguen et al. | 379/202.01 |

* cited by examiner

*Primary Examiner* — Siming Liu
(74) *Attorney, Agent, or Firm* — Ying Wang

(57) ABSTRACT

A method includes determining, for a particular time period, a scheduled location for a device based on a schedule corresponding to a user of the device. The method further includes configuring a set of network devices, that have a signal coverage area which includes the scheduled location, such that a first subset of the network devices is configured for connecting with the first client device during the particular time period and a second subset of network devices is configured for not connecting with the first client device during the particular time period.

20 Claims, 5 Drawing Sheets

METHOD AND SYSTEM TO CONFIGURE NETWORK DEVICES

TECHNICAL FIELD

The present disclosure relates to configuring network devices. In particular, the present disclosure relates to configuring a set of network devices at a location such that only a subset of the network devices connect to a client device at a particular time period based on a schedule of a user of the client device.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Client devices within WLANs communicate with access points to obtain access to one or more network resources. Access points are digital devices that may be communicatively coupled to one or more networks (e.g., Internet, an intranet, etc.). Access points may be directly connected to the one or more networks or connected via a controller. An access point, as referred to herein, may include a Wireless Access Point (WAP) that communicates wirelessly with devices using Wi-Fi, Bluetooth or related standards and that communicates with a wired network. A WAP may include a mesh point or mesh portal.

Access points generally accept connection requests from client devices that provide the correct security credentials (for example, a password associated with a Basic Service Set Identification (BSSID) identifying a Wireless Local Area Network (WLAN) that is supported by the access point).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

A. General Overview

In an embodiment, a user's schedule is analyzed to identify a location that the user is scheduled to be at during a particular time period. The location is used as a scheduled location for a device associated with that user. A network device(s) associated with the scheduled location, such as one or more access points for example, is selected for providing network access to the device. Neighboring network devices near the selected network device(s) are configured to reject requests for establishing or maintaining a connection with the user's device to force the user's device to communicate only to the selected network device(s).

In an embodiment, each network device in a vicinity is assigned to a particular location within that vicinity. For a particular period of time, each network device is configured with a list of devices that the network device can connect to. The list of devices for a network device associated with a location is generated based on a device user's schedule indicating that the device user will be at the location. Each network device then connects only with the devices on the list of devices that the network device is configured to connect to at the particular period of time.

B. Architectural Overview

Figure 1:
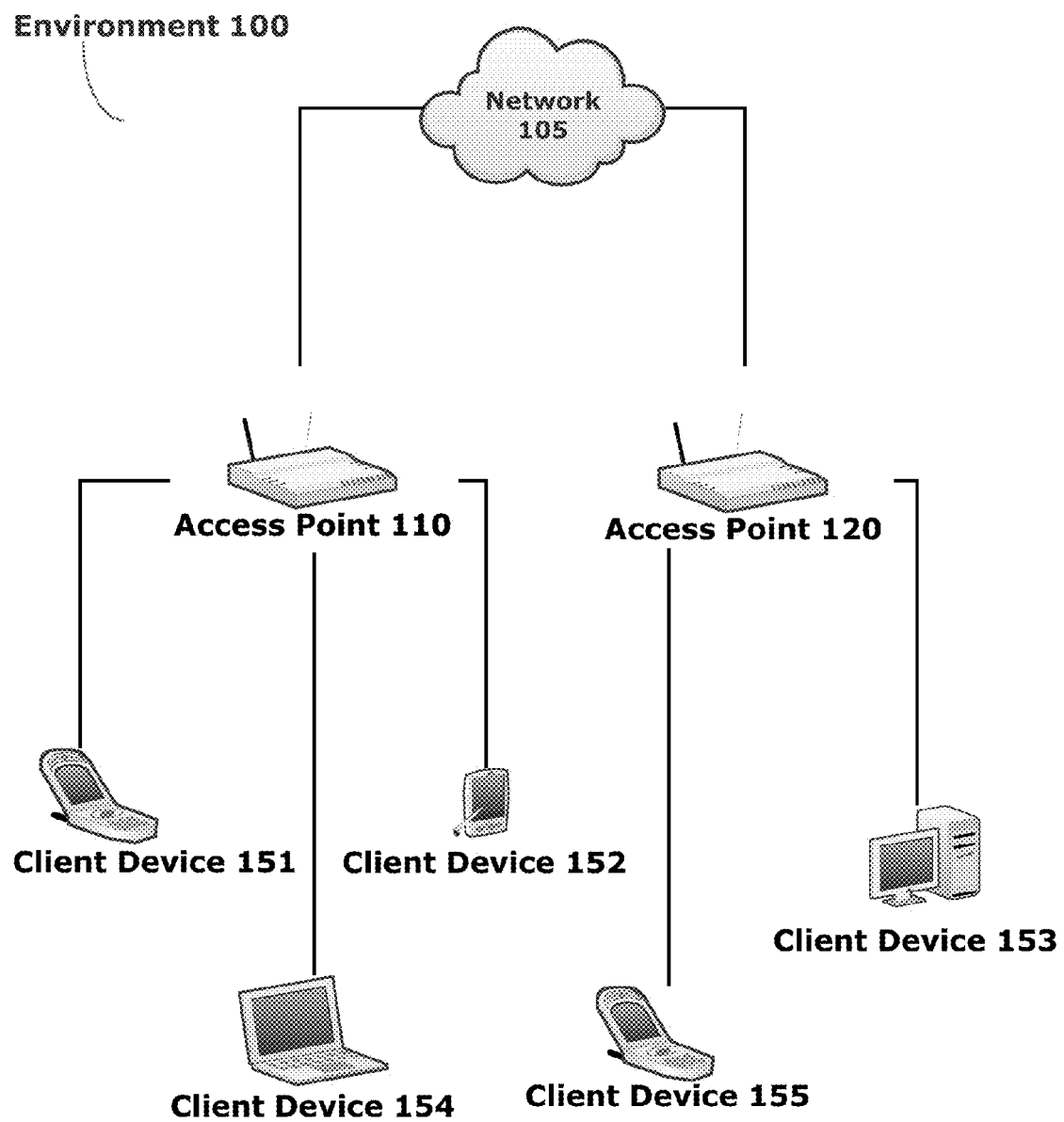
FIG. 1 shows a block diagram example of a system in accordance with one or more embodiments.

FIG. 1 shows an example of an environment 100 in accordance with one or more embodiments. Embodiments relate to configuring network devices for connecting or not connecting to a client device. Examples described herein, refer to access points which are one example of a network device. The examples are equally applicable to any other network device which provides services to client devices and are not specifically mentioned.

Environment 100, as illustrated in FIG. 1, is an indoor or outdoor environment with devices that connect to a network 105 (for example, a Local Area Network, a Wide Area Network, the Internet, Intranet, etc.) and include one or more access points (for example, access point 110 and access point 120), and one or more client devices (for example, client devices 151-155). Examples of environment 100 include college campuses, business buildings, hotel rooms, sports stadiums, and airports.

In an embodiment, environment 100 may include more or less devices, than the devices illustrated in FIG. 1, which may be connected to other devices within environment 100 via wired and/or wireless segments. Examples described herein refer to a specific number and/or types of devices for purposes of clarity and explanation. In an example, environment 100 includes a controller (not shown) which is programmed for configuring one or more access points (for example, access point 110 and access point 120) within environment 100. The controller links access point 110 and/or access point 120 to network 105.

The access point 110 and the access point 120 are communicatively coupled at least to the network 105 via a transmission medium to send and receive data. The transmission medium is a wired and/or a wireless connection. The access point 110 and the access point 120 each correspond to a network device such as a wired access port, a wireless access port, a switch, a router, or any combination thereof. In another example, the access point 110 is a cellular phone configured as a hot spot / bridge for connecting a laptop to a network. Examples of components within an access point are described below with reference to FIG. 2.

Access points within an environment 100 may be on a same Internet Protocol (IP) subnet or different IP subnets. In an example, access point 110 is located within a first hotel room and access point 120 is located within a second hotel room. In another example, access point 110 is located within or close to a first seating section at a baseball stadium and access point 120 is located within or close to a second seating section at the same baseball stadium. In another example, access point 110 is a primary access point and access point 120 is a secondary access point. The secondary access point is used by client devices when the primary access point is unavailable or has a met a maximum threshold of client devices or data traffic.

In an embodiment, the client devices 151-155 are digital devices that include a processor, memory, and input/output (I/O) interfaces such as an IEEE 802.11 wireless interface, and are configured to receive a network service. The wireless interface within a client device is used to communicate with the access point 110 and/or the access point 120. Examples of client devices 151-155 include but are not limited to personal computers, laptop computers, netbook computers, wireless music players, portable telephone communications devices, smart phones, tablets, and digital televisions. Client devices 151-155 may be carried by respective users from outside of the environment 100 to inside of the environment 100. Client devices 151-155 may be carried by respective users between different locations with environment 100.

C. Access Points

Figure 2:
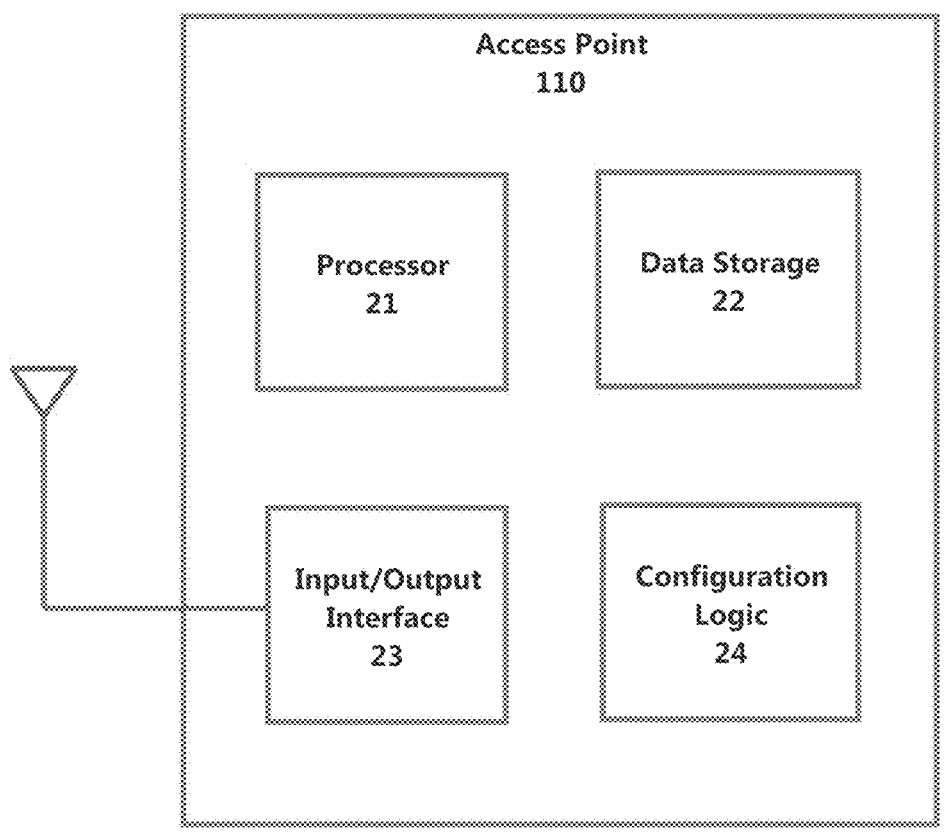
FIG. 2 shows a block diagram example of an access point in accordance with one or more embodiments.

FIG. 2 shows a block diagram example of access point 110 in accordance with one or more embodiments. The access point 110 is a network device that comprises one or more of: a processor 21, data storage 22, an I/O interface 23, and a configuration logic 24. Other access points within environment 100 may be configured similarly or differently than access point 110.

The data storage 22 of the access point 110 comprises volatile and/or non-volatile memory. For instance, the data storage 22 may include a fast read-write memory for storing programs and data during the access point 110's operations and a hierarchy of persistent memory such as ROM, EPROM, and Flash memory for storing instructions and data needed for the startup and/or operations of access point 110. The data storage 22 stores data that is to be transmitted from the access point 110 or data that is received by access point 110. In an embodiment, the data storage 22 is a distributed set of data storage components.

In an embodiment, the I/O interface 23 corresponds to one or more components used for communicating with other devices via wired or wireless segments. The I/O interface 23 may include a wired network interface such as an IEEE 802.3 Ethernet interface and/or a wireless interface such as an IEEE 802.11 WiFi interface.

The processor 21 is coupled to the data storage 22 and the I/O interface 23. The processor 21 may be any processing device including, but not limited to a MIPS-class processor, a microprocessor, a digital signal processor, an application specific integrated circuit, a microcontroller, a state machine, or any type of programmable logic array.

In an embodiment, the configuration logic 24 includes one or more functional units implemented using firmware, hardware, software, or a combination thereof. Although, the configuration logic 24 is shown as implemented on access point 110, one or more physical or functional components of the configuration logic 24 may be implemented on a separate device such as a controller or other network device. The configuration logic 24 is used for configuring access point 110 to accept or reject requests for establishing or maintaining connections with one or more devices (for example, client devices). In an embodiment, access point 110 and access point 120 are configured for connecting with client devices based on the schedules of the users of the client devices. Embodiments for configuring access points for connecting with client devices based on schedules of users of the client devices are described below with reference to FIG. 3.

D. Configuring Access Points

Figure 3:
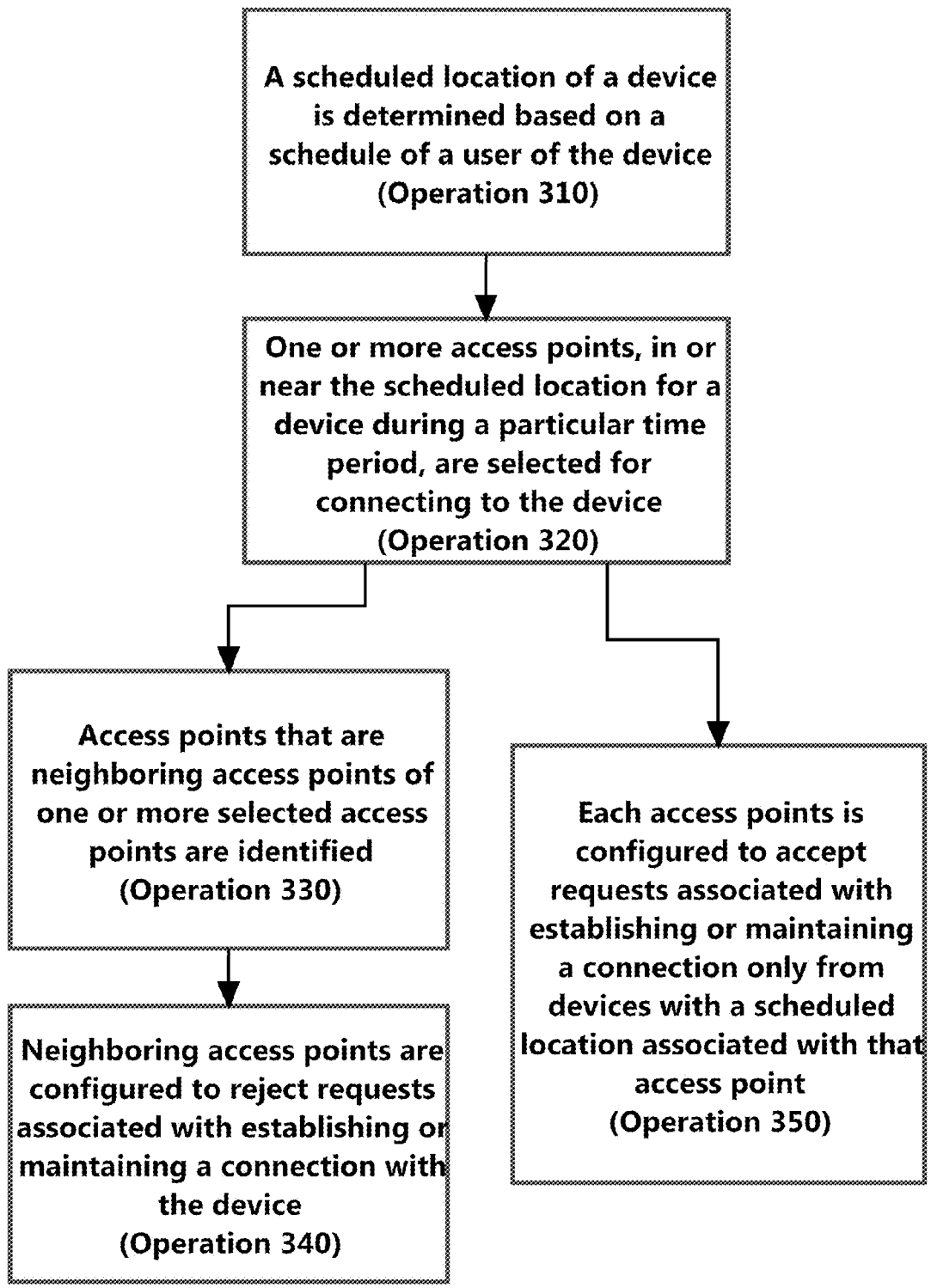
FIG. 3 illustrates an example of a method for configuring access points in accordance with one or more embodiments.

FIG. 3 illustrates an example method for configuring any type of network device. The operations refer to a particular example of a network device, i.e., access points for purposes of clarity. One or more operations illustrated in FIG. 3 may be modified, rearranged, or omitted all together. Accordingly, the specific sequence of operations should not be construed as limiting the scope of any of the embodiments.

In an embodiment, a scheduled location of a client device is determined based on a schedule of a user of the client device (Operation 310). A schedule (also referred to herein as a "user schedule") refers to any information indicating a location that the user is scheduled to be at during a particular time period. A scheduled location of a client device may be based on events accepted by a user, to-be accepted by a user, or scheduled for the user without any affirmative action by the user to accept the event. In an example, a corporation may schedule some employees for an emergency evacuation training at 10 am on Thursday in the "Short Fin" conference room. As a result of the scheduling by the corporation, the schedule of the employees (maintained by the employees or the corporation) indicates that the employees will be in the Short Fin conference room at 10 am on Thursday. In another example, Albert may invite Mark for a meeting at a particular time. As a result of the invitation, Mark may be considered to be "scheduled" for the meeting (as referred to herein) even before Mark has accepted the meeting request.

In an embodiment, a location may refer to any indoor or outdoor space. Examples of a location include, but are not limited to a cubicle, an office, a conference room, a hotel room, a seat in a stadium, a seating section in a stadium, a seating section in an airplane, an area within a concert hall, etc. The scheduled location of the client device is the location that a user or owner of the client device is scheduled to be at during a particular time period.

In one example, a user schedule is a student's class schedule that indicates the student is scheduled to be in Physics Building Room 120 from 10 am to 11 am to attend Physics 101. Based on the student's class schedule, the scheduled location for the student's laptop is determined to be Physics Building Room 120.

In an example, a user schedule is a hotel room reservation indicating that a tourist has reserved and/or paid for hotel room 430 for the night of Jan. 2, 2013 at the Grand Access Hotel in Aruba. Based on the hotel room reservation, the scheduled location for a smart phone owned by the tourist is hotel room 430 from 3 pm on Jan. 2, 2013 (hotel check-in time) to 11 am on Jan. 3, 2013 (hotel check-out time).

In another example, a user schedule is a calendar meeting (for example, in a calendar management application) indicating that a particular employee is scheduled for discussing an annual company budget in the Fish Bowl Conference Room. Based on the calendar meeting, the scheduled location for both a laptop and a cell phone, associated with the employee, is the Fish Bowl Conference Room.

In another example, a user schedule refers to a ticket or reservation at a sports arena identifying a particular seat reserved for a soccer fan during a particular soccer game. Based on the ticket or reservation, the scheduled location, for a media player owned by the soccer fan, during the particular soccer game is determined to be the particular seat and/or a section in which the seat is located.

In another example, a user's schedule indicates that the user is not scheduled for any specific event at a particular time period. Based on the user's schedule, the scheduled location, for the user is determined to be a default location for the user. An employee's cubicle of office is determined to be a scheduled location for the employee's laptop during time periods when the employee is not scheduled for any meetings. In another example, a student's dorm room is determined to be a scheduled location for the student's tablet device when the student is not scheduled for any classes.

In an embodiment, one or more access points, in or near the scheduled location for a device, are selected for connecting to the device during a particular time period (Operation 320). Selection of the access points may be performed by executing a query based at least on the scheduled location of a device to identify access points associated with the scheduled location.

In one example, if the scheduled location for a device is the Fish Bowl Conference Room, then the one or more access points within the Fish Bowl Conference Room are selected for connecting to the device. In another example, if the scheduled location for a device is a particular seat within Section B of an arena, then an access point associated with Section B is selected for connecting to the device.

In an embodiment, multiple access points associated with a scheduled location for a device may be identified in response to a query for the scheduled location of the device. The multiple access points may all be selected for connecting with the client device. Alternatively, a subset of the multiple access points may be selected for connecting with the client devices.

In an example, when twenty client devices have a scheduled location of the Fish Bowl Conference Room from 9 am to 10 am and two access points are located in the Fish Bowl Conference Room, then one access point may be selected to connect to ten of the client devices and other access point may be selected to connect to the remaining ten of the client devices.

In an embodiment, access points that are neighboring access points of one or more selected access points are identified (Operation 330). Neighboring access points of a selected access point are access points that are physically in a same vicinity as the selected access point. In an example, a neighboring access point of a selected access point inside a conference room is an access point just outside of the conference room. In another example, a neighboring access point of a selected access point in Section C of a stadium is the access point in a nearby Section D of that stadium. In another example, a neighboring access point of an access point in Physics Building Room 120 is the access point next door in Physics Building Room 121.

In an embodiment, the neighboring access points of a particular access point may be determined by identifying access points within a wireless communications range from the particular access point. In an example, beacon frames are received by a particular access point from other access points. A beacon frame that is received by a particular access point is analyzed to identify a sender of the beacon frame and the sender is thereafter classified as a neighbor of the particular access point.

In another embodiment, the neighboring access points of a particular access point are determined by executing commands such as "show ap neighbor" which results in execution of a query to identify all access points that are listed in a database as neighboring access points of the particular access point. Execution of a query may result in identifying neighboring access points via detecting access points within a communications range as described above or based on stored information indicating the neighboring access points for an access point. In an example, a floor in a corporate environment may be partitioned into sections where all access points within each section are classified as neighboring access points of one another. Accordingly, the neighboring access points of a selected access point in the marketing section are all other access points within the marketing section regardless of whether the selected access point is within a communications range from the other access points.

In an embodiment, the neighboring access points, of one or more selected access points associated with the scheduled location of a device, are configured to reject one or more requests associated with establishing or maintaining a connection from the device (Operation 340). Requests associated with establishing or maintaining a connection include, but are not limited to, association requests, re-association requests, probe requests, and authorization requests. A request may be rejected by sending a rejection message or by not responding to the request. In an embodiment, rejecting one or more requests associated with maintaining a connection from the device includes terminating a current connection with the device.

In an example, two employees, Venkatesh and Mark schedule a meeting in a calendar application to meet in a Fish Bowl conference room from 3 pm to 4 pm on Jan. 5, 2012. The calendar application notifies a network device (for example, an access point controller used for configuring access points) that Venkatesh and Mark are scheduled to meet in the Fish Bowl conference room from 3 pm to 4 pm on Jan. 5, 2012. The network device queries a database to obtain an identification (for example, MAC address or IP address) of devices that are associated with Venkatesh and Mark. The network device further queries a database to identify access points within the Fish Bowl conference room and neighboring access points of the access points within the Fish Bowl conference room. Based on the queries, the network device determines that Access Point A is within the Fish Bowl conference room and that Access Point B and Access Point C are just outside of the Fish Bowl conference room. The network device transmits the identification of the devices associated with Venkatesh and Mark to Access Point B and Access Point C and configures both Access Point B and Access Point C to reject a request for establishing or maintaining a connection with the devices from 3 pm to 4 pm on Jan. 5, 2012.

Just prior to 3 pm, Venkatesh is using a device that is connected to an enterprise network via Access Point B. At 3 pm, Access Point B terminates the connection with Venkatesh's device and rejects requests by Venkatesh's device to re-connect. Subsequent to termination of the connection, Venkatesh's device automatically broadcasts a probe request to discover access points and re-connect to the enterprise network. Access Point B and Access Point C do not respond to the probe request. Access Point A within the Fish Bowl conference room receives the probe request and responds with a probe response and completes further communication to connect with the Venkatesh's device and provide access to the enterprise network. Access Point A may connect with Venkatesh's device before or after Venkatesh enters the Fish Bowl conference room.

Just prior to 3 pm, Mark is using a device that is connected to the enterprise network via Access Point D which is not in the same vicinity as Access Point A. Access Point D is not specially configured to reject a connection from Mark's device. Accordingly, at 3 pm, Mark continues to be connected to Access Point D. At 3:05 pm, Mark leaves the vicinity of Access Point D and walks to the Fish Bowl conference room. As Mark carries his device into the vicinity of the Fish Bowl conference room, Mark's device transmits probe requests to discover and re-connect to the enterprise network. All of Access Point A, Access Point B, and Access Point C transmit probe responses in response to probe requests received from Mark's device. However, Access Point B and Access Point C reject association and/or authorization requests from Mark's device. Access Point A accepts all requests from Mark's device and establishes a connection with Mark's device. As a result, both of Venkatesh's and Mark's devices are connected to the enterprise network via Access Point A inside of the Fish Bowl conference room.

Embodiments of the invention relate to configuring access points in or near a scheduled location for a device such that only a subset of the access points connect with the device during a particular time period. As described above, the configuration may be performed by using a negative list for neighboring access points of selected access points. Devices on the negative list of neighboring access points are prevented from connecting with the neighboring access points; this results in the devices connecting only with the selected access points. In another embodiment, positive lists may be used such that access points only accept connections from devices on the positive lists. Modifying the above example to use positive lists would involve configuring access point A to only allow connections from devices that have the Fish Bowl conference room as their scheduled location, i.e., devices corresponding to users that are scheduled to meet in the Fish Bowl conference room. Device B and Device C may be configured to only allow connections from devices with scheduled locations that are within their respective areas. For example, Device B may be in a nearby San Nicholas conference room and only allow connections during a particular time period from devices with a scheduled location of the San Nicholas conference room during the particular time period. Device C may be configured to only allow connections from devices with scheduled locations within the cubicles outside of the San Nicholas and the Fish Bowl conference rooms.

In one example, access points are configured such that a first subset of access points is configured for connecting to a client device while a second subset of access points is configured for not connecting to a client device. In this example, the first subset and the second subset have no overlapping members. This configuration may involve (a) configuring the first subset of access points with a default configuration which allows all client devices with appropriate credentials to connect to the access points and (b) configuring the second subset of access points with a special configuration which prohibits certain identified client devices (for example, by MAC address, IP address, device name, administration assigned identification, etc.) from connecting to the access points.

E. Primary and Secondary Access Points

In an embodiment, multiple access points are located near a scheduled location of a device and are capable of connecting with the device while the device is at the scheduled location. In one example, the multiple access points may be configured identically for connecting with the client device, as described above. In another example, the access points are assigned a priority. A first access point with the highest priority is the access point configured for connecting with the device while at the scheduled location. Another access point with a low priority is configured for connecting with the device while at the scheduled location only when the first access point is unavailable (for example, unreachable, rejecting requests, overloaded, or has a high error rate). In one example, an access point within a conference room is configured for connecting with all devices scheduled to be within the conference room until a maximum number of devices is reached while other access points are configured to reject connection requests from devices scheduled to be within the conference room. When the maximum number of devices has connected with the access point within the conference room, then access points outside of the conference room are re-configured to allow connections from devices scheduled to be within the conference room.

Embodiments allow for the dynamic configuration of access points based on priority assigned to each access points for connection with devices scheduled to be in a vicinity of the access points.

F. Example Scenario and Advantages

Figure 4A:
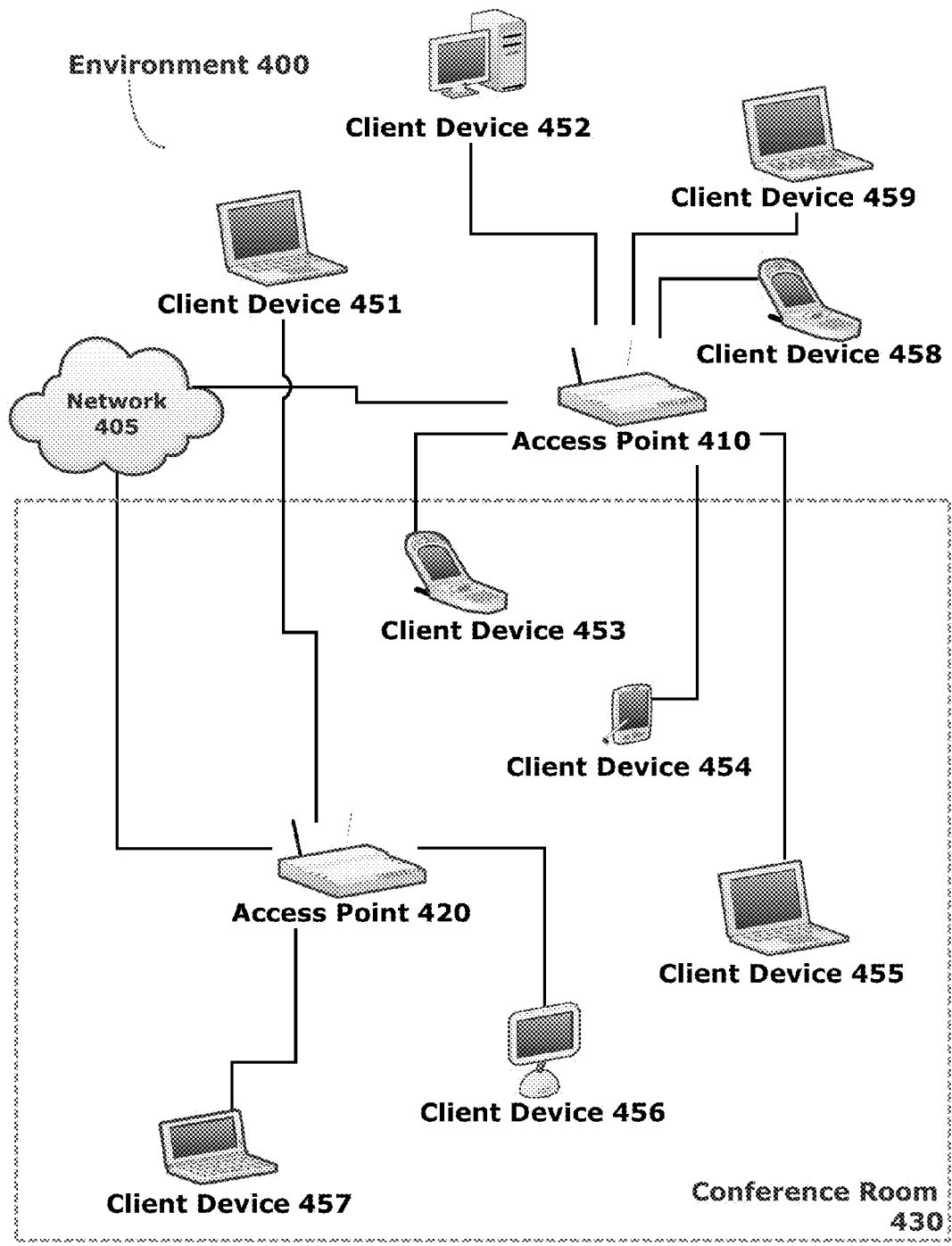
FIGS. 4A and 4B illustrate example environments.

FIG. 4A shows an example environment 400 which is a portion of a floor in a corporate environment. Environment 400, as illustrated in FIG. 4A, is a system that includes a network 405 (for example, a Local Area Network, a Wide Area Network, the Internet, Intranet, etc.), an access point 410, an access point 420, and a set of client devices 451-459. Conference room 430 may include another access point in addition to access point 420. Access point 410 and access point 420 may be on a same Internet Protocol (IP) subnet or different IP subnets. Access point 410 is close to and outside of a conference room 430 and access point 420 is inside of the conference room 430. The client devices 451-459 connect to an enterprise network 405 via one of access point 410 or access point 420. As the client devices move, the client devices may connect to different access points that are close to or far from the physical location of the client devices. When access points (for example, access points 410 and 420) are configured to accept connections from all devices, as illustrated in FIG. 4A, then client devices may connect to access points without any regard to a location of the client device, without regard to a proximity of the client device from the access point, or without regard to a load of an access point. In an example, when client device 455 connects to the access point 410 while outside of conference room 430, then client device 455 maintains the connection to access point 410 even after the client device 455 is inside the conference room 430 and closer to access point 420. As a result, six client devices 452, 453, 454, 455, 458, and 459 connect to access point 410 while only three client devices 451, 456, and 457 connect to access point 420. The access points are unevenly loaded which may result in slow connections for devices connected to access point 410.

Figure 4B:
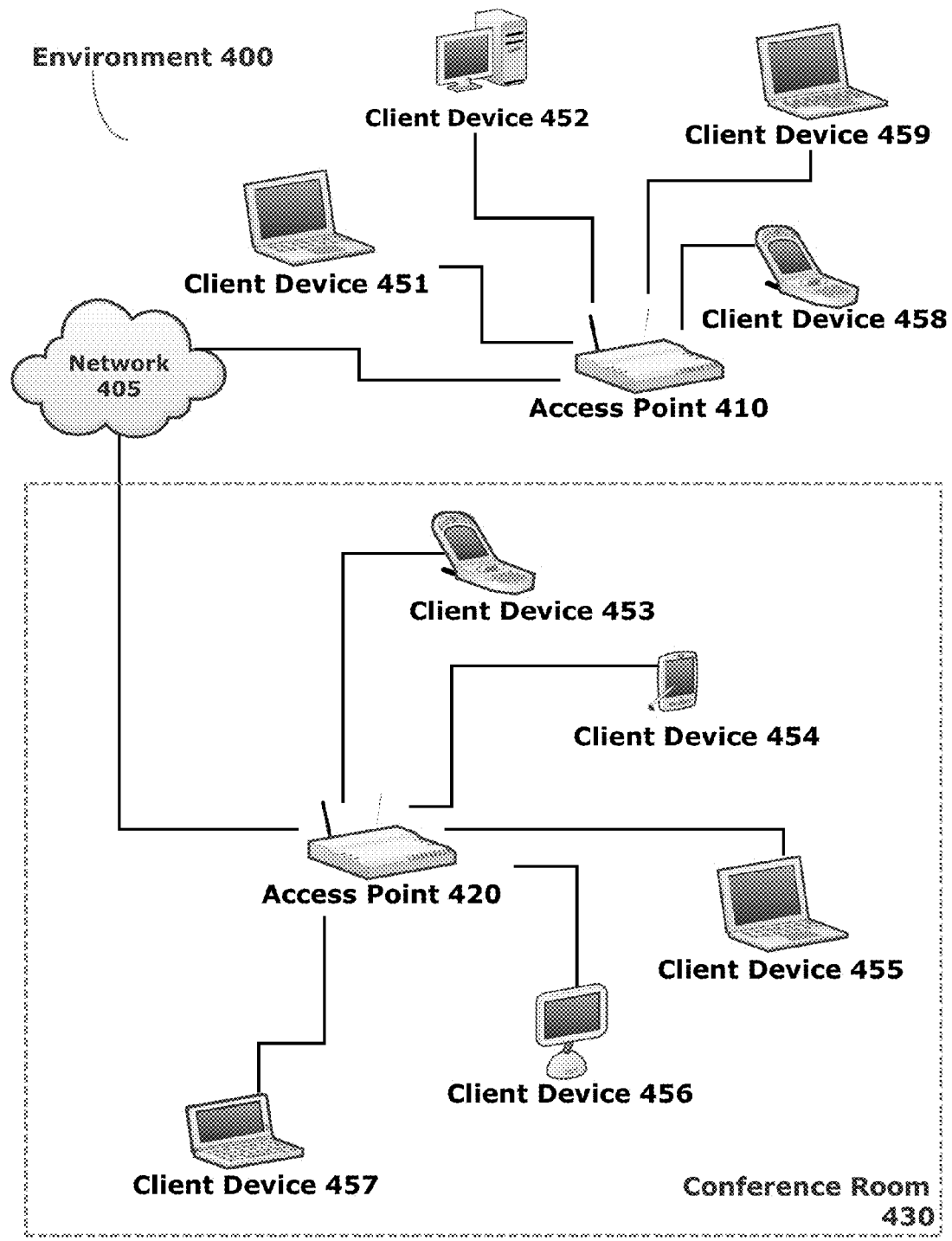

FIG. 4B shows the example environment 400 in which a schedule of a user of each client device is used to select a particular access point for connecting to that client device. The schedules of a first set of users associated with client devices 453, 454, 455, 456, and 457 indicate that the users will be in conference room 430. Based on the schedules of the first set of users, the scheduled location for the associated client devices is determined to be access point 420. Neighboring access point 410 is configured to reject connection requests from client devices 453-457 resulting in client devices 453-457 all connecting to access point 420. Furthermore, client devices 451, 452, 458, and 459 are associated with a second set of users whose schedules indicate that they will be in cubicles outside of the conference room 430 and close to access point 410. Based on the schedules, the scheduled location for client devices 451, 452, 458, and 459 is an area that is outside of conference room 430 an associated with access point 410. Access point 420 is identified as a neighbor of access point 410 and configured to reject requests for establishing or maintaining connections with client devices 451, 452, 458, and 459.

The result of using a schedule of the users to select access points for connections to corresponding devices may include one or more of:

a. a balanced distribution of workload between access points
b. improved connectivity between client devices and access points
c. faster data transmission rates due to proximity between client devices and access points
d. faster communication between client devices within the same area.

Any combination of the above features and functionalities may used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable storage medium comprising instructions which, when executed by one or more hardware processors of a digital device, cause the digital device to:
    determine, for a particular time period, a scheduled location for a first client device based on a schedule corresponding to a user of the first client device;
    select a first subset of one or more network devices from a plurality of network devices that
        have a signal coverage area which includes the scheduled location, the first subset of
        network devices being selected for connecting with the first client device; configure the plurality of network devices such that (a) the first subset of network devices is configured for connecting with the first client device and
(b) a second subset of one or
more network devices in the plurality of network devices
is configured to prohibit connecting with the first client device by configuring the second subset of network devices to reject one or more requests, associated with establishing a connection, received from the first client device.

2. The computer readable storage medium of claim 1, that comprises further instructions which, when executed by the one or more hardware processors of the digital device, cause the digital device to:
determine the second subset of network devices by executing a query to identify network devices that are neighboring network devices of the first subset of network devices and selecting the neighboring network devices as the second subset of network devices.

3. The computer readable storage medium of claim 1, wherein the instructions which, when executed by the one or more hardware processors of the digital device, cause the digital device to configure the plurality of network devices and perform operations that comprise:
configuring each of the first subset of network devices to accept one or more requests,
associated with establishing a connection, from a respective set of client devices that includes the first client device;
configuring each of the second subset of network devices to accept one or more requests, associated with establishing a connection, from a respective set of client devices that does not include the first client device.

4. The computer readable storage medium of claim 1, wherein the scheduled location is a room that the user is scheduled to be in during the particular time period.

5. The computer readable storage medium of claim 1, wherein the scheduled location is (a) a particular seat section in a plurality of seat sections at a venue or (b) a specific seat in the particular seat section in the plurality of seat sections at the venue.

6. The computer readable storage medium of claim 1, wherein the instructions which, when executed by the one or more hardware processors of the digital device, cause the digital device to configure digital device to determine, for the particular time period, the scheduled location for the first client device based on the schedule corresponding to the user of the first client device, and perform operations that comprise:
determining that the schedule corresponding to the user indicates that the user is not scheduled to be at any location during the particular time period;
responsive to determining that the user is not scheduled to be at any location during the particular time period, selecting a default location associated with the user as the scheduled location for the first client device during the particular time period.

7. The computer readable storage medium of claim 1 that comprises further instructions which, when executed by the one or more hardware processors of the digital device, cause the digital device to:
determine the first subset of network devices by executing a query based on the scheduled location to identify network devices pre-selected for providing services at the scheduled location.

8. The computer readable storage medium of claim 1, wherein the scheduled location for the first client device for the particular time period is determined based on the schedule prior to detecting the first client device at the scheduled location.

9. The computer readable storage medium of claim 1, wherein the first subset of network devices comprises a first network device designated as a primary resource and a second network device designated as a secondary resource, wherein the second network device is used for connection with the first client device when the first network device is unavailable for connection by the first client device.

10. The computer readable storage medium of claim 1, wherein the plurality of network devices comprises a plurality of access points.

11. A digital device, comprising
at least one hardware processor; and
a memory unit storing instructions, which when executed by the at least one hardware processor cause the digital device to:
determine, for a particular time period, a scheduled location for a first client device based on a
schedule corresponding to a user of the first client device;
select a first subset of one or more network devices from a plurality of network devices that
have a signal coverage area which includes the scheduled location, the first subset of
network devices being selected for connecting with the first client device; configure the plurality of network devices such that (a) the first subset of network devices is
configured for connecting with the first client device and (b) a second subset of one or
more network devices in the plurality of network devices is configured to prevent connecting with the first client device by configuring the second subset of network devices to reject one or more requests, associated with establishing a connection, received from the first client device.

12. The digital device of claim 11, wherein the memory unit includes further instructions that when executed by the at least one hardware processor further cause the digital device to:
determine the second subset of network devices by executing a query to identify network devices that are neighboring network devices of the first subset of network devices and selecting the neighboring network devices as the second subset of network devices.

13. The digital device of claim 11, wherein the memory unit stores instructions which, when executed by the at least one hardware processor, cause the digital device to configure the plurality of network devices by performing operations that comprise:
configuring each of the first subset of network devices to accept one or more requests, associated with establishing a connection, from a respective set of client devices that includes the first client device;
configuring each of the second subset of network devices to accept one or more requests, associated with establishing a connection, from a respective set of client devices that does not include the first client device.

14. The digital device of claim 11, wherein the scheduled location is a room that the user is scheduled to be in during the particular time period.

15. The digital device of claim 11, wherein the scheduled location is (a) a particular seat section in a plurality of seat sections at a venue or (b) a specific seat in the particular seat section in the plurality of seat sections at the venue.

16. The digital device of claim 11, wherein the memory unit stores instructions which, when executed by the at least one hardware processor, cause the digital device to determine, for the particular time period, the scheduled location for the first client device based on the schedule corresponding to the user of the first client device by performing operations that comprise:

determining that the schedule corresponding to the user indicates that the user is not scheduled to be at any location during the particular time period;

responsive to determining that the user is not scheduled to be at any location during the particular time period, selecting a default location associated with the user as the scheduled location for the first client device during the particular time period.

17. The digital device of claim 11, wherein the memory unit includes further instructions that when executed by the at least one hardware processor further cause the digital device to determine the first subset of network devices by executing a query based on the scheduled location to identify network devices pre-selected for providing services at the scheduled location.

18. The digital device of claim 11, wherein the scheduled location for the first client device for the particular time period is determined based on the schedule prior to detecting the first client device at the scheduled location.

19. The digital device of claim 11, wherein the first subset of network devices comprises a first network device designated as a primary resource and a second network device designated as a secondary resource, wherein the second network device is used for connection with the first client device when the first network device is unavailable for connection by the first client device.

20. The digital device of claim 11, wherein the plurality of network devices comprises a plurality of access points and the digital device is one of the access points.

* * * * *